2 Sheets—Sheet 2

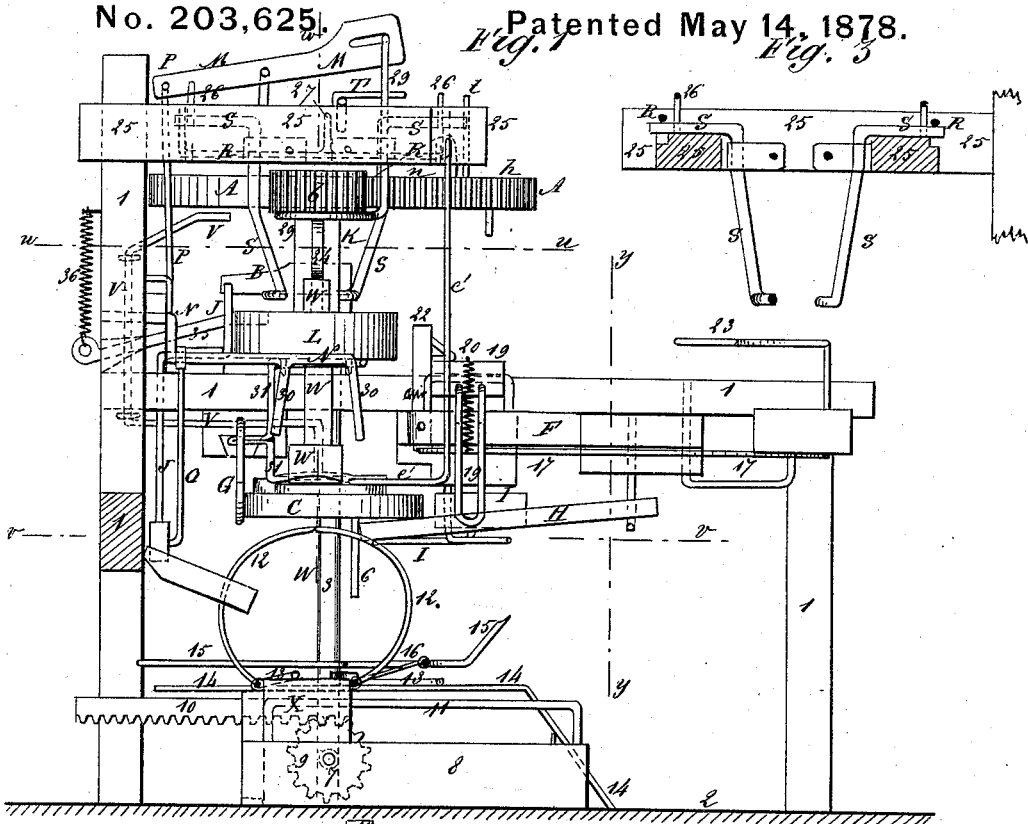

R. O. KINNE.
Grain-Binder.

No. 203,625. Patented May 14, 1878.

WITNESSES:
C. Neveux
C. Sidgwick

INVENTOR:
R. O. Kinne
BY Munn & Co.
ATTORNEYS.

UNITED STATES PATENT OFFICE.

REUBEN O. KINNE, OF EL DORADO, ILLINOIS.

IMPROVEMENT IN GRAIN-BINDERS.

Specification forming part of Letters Patent No. 203,625, dated May 14, 1878; application filed December 26, 1877.

*To all whom it may concern:*

Figure 5:
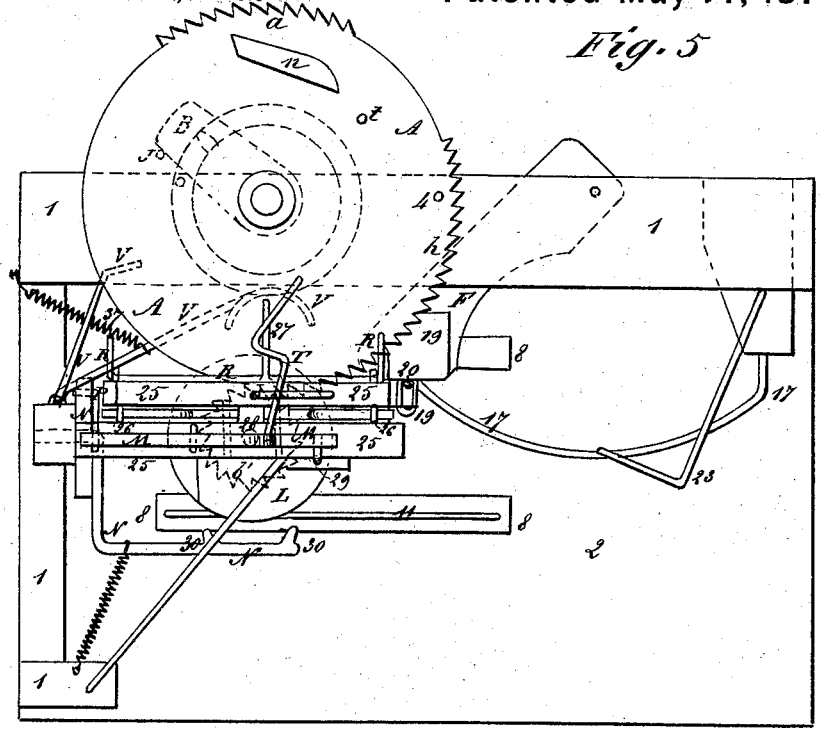
Figure 6:
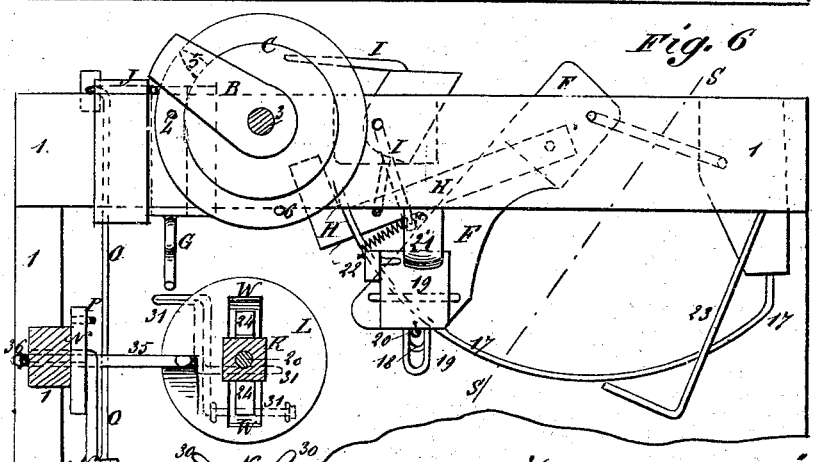
Figures 7, 8:
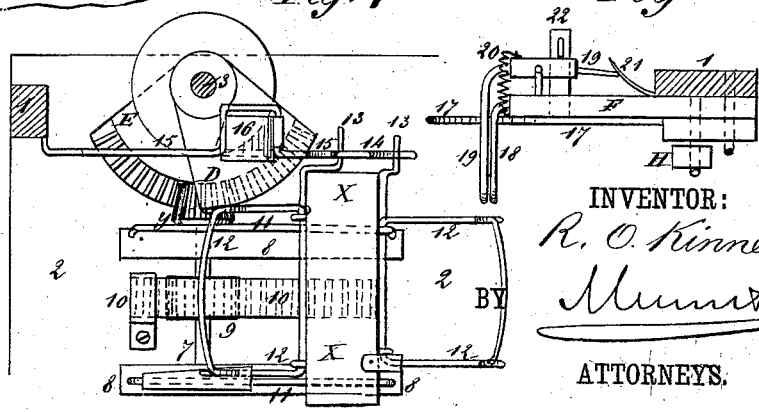

Be it known that I, REUBEN O. KINNE, of El Dorado, in the county of Saline and State of Illinois, have invented a new and useful Improvement in Grain-Binder for Reapers, of which the following is a specification:

Figure 1, Sheet 1, is a side view of my improved machine, partly in section, through the line $x\ x$, Fig. 2. Fig. 2, Sheet 1, is a front view of the same, partly in section, through the line $y\ y$, Fig. 1. Fig. 3, Sheet 1, is a detail section taken through the line $z$, Fig. 2. Fig. 4, Sheet 1, is a detail section taken through the line $w\ w$, Fig. 1. Fig. 5, Sheet 2, is a top view of the machine. Fig. 6, Sheet 2, is a horizontal section of the same, taken through the line $u\ u$, Fig. 1. Fig. 7, Sheet 2, is a detail horizontal section taken through the line $v\ v$, Fig. 2. Fig. 8, Sheet 2, is a detail section taken through the line $s\ s$, Fig. 6.

Similar letters of reference indicate corresponding parts.

The object of this invention is to furnish an improved binding attachment for reapers which shall be so constructed as to bind the grain with straw bands, and which will be reliable in its operation.

The invention consists in the combination of the swinging lever, the jaws, the spring, the spring-catch, the stops, and the guide-rod with the frame of the machine for placing the straw band upon the platform that receives the gavel; in the combination of the push-bar, the lever, and the pin with the swinging lever that carries the jaws, with the frame, and with the wheel attached to the driving-shaft; in the combination of the hinged clamping-frames, the cranks, and the guides with the platform that receives the gavel, for drawing the ends of the band together around the said gavel; in the combination of the toothed segments, the gear-wheels, and the toothed rack with the driving-shaft, and with the platform that receives the gavel; in the combination of the small gear-wheel, the shaft, the disk, the jaws, and the springs with the wheel attached to the driving-shaft, for grasping and twisting the ends of the straw band; in the combination of the guide-rod, the bent lever, the spring, and the pin with the wheel attached to the driving-shaft and the jaws, for passing the ends of the straw band into the said jaws; in the combination of the pivoted guides, the rod provided with arms upon its end and middle parts, the spring-catch, the inclined block, and the pin with the jaws that twist the ends of the band, and with the wheel attached to the driving-shaft; in the combination of the tucker, the sliding hook, the springs, and the projection upon the wheel with the jaws that twist the ends of the band, and the said wheel attached to the driving-shaft; in the combination of the fingers, the lever, the connecting-rod, the lever, and the spring with the arm attached to the driving-shaft, and with the jaws, and the tucker for holding the band while its ends are being pushed beneath its body by the said tucker; in the combination of the supporting-rod, the lever, the connecting-rod, the bent lever, the connecting-rod, the lever, and the spring with the arm attached to the driving-shaft, and with the small gear-wheel, the shaft, the disk, and the jaws; and in the combination of the lever or pin and its spring with the frame and the disk that carries the jaws, as hereinafter fully described.

1 represents the upright frame, and 2 the platform, of the machine. In bearings attached to the side part of the frame 1 revolves a vertical shaft, 3, to the upper end of which is attached a large horizontal wheel, A. Upon the rim of the wheel A are formed sections of gear-teeth $a\ h$.

To the upper side of the wheel A, near the gear-teeth $a$, is attached an inclined block, $n$, and at a little distance from said incline $n$ an upright pin, $t$, and to its lower side, near the forward end of the gear-section $h$, is attached a pin, 4.

To the shaft 3, a little below the wheel A, is attached an arm, B. To the shaft 3, a little below the top bar of the side part of the frame 1, is attached a wheel, C, upon the upper side of which is formed, or to it is attached, a projection or stud, 5, and to its lower side is attached a pin, 6.

To the lower part of the shaft 3 are attached two segmental wheels, D E, projecting at an angle with each other, having gear-teeth formed upon their adjacent sides, and being at such a distance apart that their teeth may mesh successively into the teeth upon the upper and lower sides of the small gear-wheel $y$, and thus turn it successively in opposite directions. The gear-wheel $y$ is attached to the end of a shaft, 7, which revolves in bearings in stationary bars 8 attached to the platform 2.

To the shaft 7 is attached a gear-wheel, 9, the teeth of which mesh into the teeth of the rack-bar 10 attached to the platform X, that receives the gavel to be bound, and that slides upon guide-rods 11, the ends of which are bent downward, and are attached to the bars 8, so that the said platform may be moved back and forth by the reciprocating revolution of the gear-wheel $y$.

To the front and rear edges of the platform X are hinged semi-cylindrical frames 12, to be turned up to clasp the gavel, press the ends of the band together around the said gavel, and hold it while being bound, and the top bars of which are curved inward to give space for the clamps that grasp and twist the ends of the band. The inner ends of the base or pivoting rods of the clamping-frames 12 project, and have small cranks 13 formed upon them.

The rear crank 13 is moved to raise the rear frame 12 around the gavel by sliding up the inclined rear part of the guide-rod 14, attached to the platform 2, and the said frame is held up by the horizontal part of the said guide-rod 14.

The forward crank 13 is moved to raise the forward frame 12 around the gavel by sliding down the inclined rear part of the guide-rod 15, attached to the frame I, and the said frame is held up by the horizontal part of the said guide-rod 15. The guide-rod 15 is made with an offset to allow the forward crank 13 to pass to the upper side of the guide-rod 15, and the said crank is compelled to pass out through the said offset by the plate 16, hinged to the rear arm of the said offset, and which rests upon the guide-rod 14, except when raised by the forward movement of the crank 13 beneath the guide-rod 15.

The plate 16 is made of such a length as to overlap the forward arm of the offset when raised, so as to prevent the passing out of the crank when moving forward. The clamping-frames 12 drop open by their own weight when their cranks 13 are released from the guide-rods 14 15.

As the shaft 3 revolves, the pin 6, attached to its lower side, strikes the forward end of the bar H and pushes it back, and then strikes the forward end of the lever I and pushes it outward. The lever I is pivoted to the frame 1 or to a block attached to the said frame, and its rear end is pivoted to the bar H, so that the said bar H may be drawn forward by the movement of the said lever I. The rear end of the bar H is pivoted to the lever F at a little distance from the rear end of the latter, so that its movements may operate the said lever F. The lever F is pivoted at its outer end to the top bar of the side part of the frame 1, and its inner end is supported by and moves along the curved guide-rod 17, the ends of which are attached to the frame 1.

To the end of the lever F is attached a jaw, 18, and to the upper side of said end is hinged another jaw, 19, which jaws 18 19 are held together by a spring, 20. The jaws 18 19 are designed to receive a straw band, carry it forward, and drop it across the platform X, its end parts resting upon the curved bars of the clamping-frames 12. The jaws 18 19 are opened at the end of their forward movement to drop the band by an inclined stop-plate, 21, attached to the frame 1, and against which the projecting shank of the hinged jaw 19, or an arm attached to said jaw, strikes, and are held open by a spring-catch, 22, attached to the end of the lever F, until the said lever has nearly reached the end of its forward movement and another band has been placed between them.

As the lever F approaches the end of its rearward movement the spring-catch 22 is pushed back to allow the jaws 18 19 to close upon the band by the stop-rod 23, attached to the frame. As the platform X moves forward and the clamping-frames 12 are raised around the gavel, in the manner hereinbefore described, the curved top bars of the said frames draw the ends of the band together above the gavel, and the inclined lower arm of the rod $e'$ guides them opposite to the space between the open jaws W, into which space they are pushed by the curved lower arm of the bent lever V. The bent lever V is pivoted to a post of the frame 1, and its upper arm projects into such a position as to be struck at the proper time by the pin 4, attached to the under side of the wheel A. The bent rod V is drawn back when its work is done by a spring, 37, attached to it and to the frame 1.

The jaws W are pivoted in radial slots in the disk L, attached to the lower end of the short shaft K, and are held together by springs 24, attached to the opposite sides of the said shaft K.

The upper ends of the jaws W project above the disk L, and are beveled upon their inner sides, so that their inward movement will not interfere with the springs 24. The jaws W are spread apart to receive the ends of the band by the curved lower arms of the guide-rods S, which are pivoted in a slot in the arm 25, rigidly attached to the end frame 1.

The upper arms of the rods S are bent outward and pass through long keepers 26, so that, when the said upper arms are left free, the lower arms will swing outward, and will not open the jaws W.

The rods S are locked in position to open the jaws W by the end arms of the rod R, which works in bearings attached to the arm 25, and to the middle part of which is attached, or upon it is formed, an arm, 27. The arm 27 is made heavy, so as, when left free, to drop down upon the wheel A and raise the end arms of the rod R from the rods S. The arm 27 is raised by the inclined block $n$, attached to the wheel A, and is held up when raised by the spring-catch T, attached to the arm 25. The spring-catch T is pushed back to release the arm 27 of the rod R by the pin $t$, attached to the wheel A.

The upper end of the shaft K is attached to a small gear-wheel, $b$, the teeth of which mesh into the teeth $a\ h$ of the wheel A, and which revolves and slides upon a journal, 28, attached to the arm 25. The journal 28 is slightly inclined, so that, when the gear-wheel $b$ and the shaft K are lowered, the jaws W may come in contact with the bundle at one side of the band.

The gear-wheel $b$, the shaft K, and its attachments are raised and lowered by the rod 29, in an eye formed upon the lower end of which the upper part of the shaft K revolves. The rod 29 is bent upward, slides in a bearing attached to the arm 25, and its upper end is bent at right angles and passes through a short slot in the inner end of a lever, M. The lever M is pivoted to a support attached to the arm 25, and to its outer end is pivoted the upper end of a connecting-rod, P, the lower end of which is pivoted to a lever, N.

The lever N is pivoted to a post of the end frame 1, and to it is pivoted the inner end of a connecting-rod O, the outer end of which is pivoted to the lower end of a lever, J. The lever J is pivoted to a support attached to the top bar of the side frame 1, and its upper end projects into such a position that it may be struck and operated by the arm B, attached to the shaft 3.

The outer part of the lever N is bent inward, and to it are attached two prongs or fingers, 30, which, when the jaws W are lowered to the bundle at one side of its band, are also lowered to the bundle at the other side of its band, to prevent the said band from being pushed to one side by the act of the tucker 31 when tucking the ends of the band beneath the body of the said band.

The lever N, the gear-wheel $b$, and the shaft K and its attachments are raised by a spring, 32, one end of which is attached to the said lever N, and its other end is attached to a post of the frame 1.

The tucker 31 is hinged to the lower side of the disk L, extends along the lower side of said disk, extends outward and downward, extends inward and downward, and is bent to pass along the edge of one of the jaws W. Upon the outer angle of the tucker 31 is formed an arm, which, as the tucker 31 moves downward with the disk L and jaws W, enters a hook, G, the shank of which slides in a guide-block attached to the frame 1. The slide-hook G is pushed forward at the proper time by the projection 5 of the wheel C, and which strikes against a pin or projection attached to or formed upon the said hook. As the hook G moves forward it forces the tucker 31 forward to push the ends of band, which at that moment are released from the jaws W, beneath the body of the said band.

The tucker 31 is raised when it completes its work by a spring, 33, attached to it and to the disk L.

The sliding hook G is drawn back when it completes its work by a spring, 34, attached to it and to the block in which it slides.

The disk L is stopped in exactly the right position by a lever or pin, 35, which drops into a notch in its upper side, is pivoted to a post of the frame 1, and is held down upon the said disk by a spring, 36, attached to its outer end and to the said post.

Having thus described my invention, I claim as new and desire to secure by Letters Patent—

1. The combination of the swinging lever F, the jaws 18 19, the spring 20, the spring-catch 22, the stops 21 23, and the guide-rod 17 with the frame 1, for placing the straw band upon the platform X, that receives the gavel, substantially as herein shown and described.

2. The combination of the push-bar H, the lever I, and the pin 6 with the swinging lever F, that carries the jaws 18 19, with the frame 1, and with the wheel C, attached to the shaft 3, substantially as herein shown and described.

3. The combination of the hinged clamping-frames 12 12, the cranks 13 13, and the guides 14 15 16 with the platform X, for drawing the ends of the band together around the gavel, substantially as herein shown and described.

4. The combination of the toothed segments D E, the gear-wheels $y$ 9, and the toothed rack 10 with the driving-shaft 3, and with the platform X, that receives the gavel, substantially as herein shown and described.

5. The combination of the guide-rod $e'$, the bent lever V, the spring 37, and the pin 4 with the wheel A and the jaws W, for passing the ends of the straw band into the said jaws W, substantially as herein shown and described.

6. The combination of the pivoted guides S, the rod R, provided with arms upon its end and middle parts, the spring-catch T, the inclined block $n$, and the pin $t$ with the jaws W and the wheel A, attached to the driving shaft 3, substantially as herein shown and described.

7. The combination of the tucker 31, the sliding hook G, the springs 33 34, and the projection 5 with the jaws W and the wheel C, attached to the shaft 3, substantially as herein shown and described.

8. The combination of the fingers 30, the lever N, the connecting-rod O, the lever J, and the spring 32 with the arm B, attached to the shaft 3, and with the jaws W and the tucker 31, for holding the band while its ends are being pushed beneath its body by the said tucker 31, substantially as herein shown and described.

9. The combination of the supporting-rod 29, the lever M, the connecting-rod P, the lever N, the connecting-rod O, the lever J, and the spring 32 with the arm B, attached to the shaft 3, and with the gear-wheel b, the shaft K, the disk L, and the jaws W, substantially as herein shown and described.

10. The combination of the lever or pin 35 and the spring 36 with the frame 1 and the disk L, that carries the jaws W, substantially as herein shown and described.

REUBEN OLIVER KINNE.

Witnesses:
ZECHARIAH COX,
JOHN W. COX.